United States Patent [19]
Banjamin et al.

[11] Patent Number: 6,110,113
[45] Date of Patent: Aug. 29, 2000

[54] METHOD AND APPARATUS FOR REMOVING TRANSIENTS AND GAPS FROM ULTRASOUND ECHO SIGNALS

[75] Inventors: Zoran Banjamin, Seattle; Lin-Xin Yao, Bellevue, both of Wash.

[73] Assignee: Siemens Medical Systems, Inc., Iselin, N.J.

[21] Appl. No.: 09/212,015

[22] Filed: Dec. 15, 1998

[51] Int. Cl.$^7$ .................................................. A61B 8/06
[52] U.S. Cl. .......................................... 600/441; 600/455
[58] Field of Search ........................... 600/441, 454–456; 73/821, 25

[56] References Cited

U.S. PATENT DOCUMENTS

| | | | |
|---|---|---|---|
| 5,016,641 | 5/1991 | Schwartz | 600/455 |
| 5,249,578 | 10/1993 | Karp et al. | 600/447 |
| 5,419,333 | 5/1995 | Hagiwara et al. | 600/455 |
| 5,476,097 | 12/1995 | Robinson | 600/441 |
| 5,706,817 | 1/1998 | Song et al. | 600/453 |
| 5,823,964 | 10/1998 | Liu et al. | 600/454 |
| 5,876,341 | 3/1999 | Wang et al. | 600/441 |
| 5,913,824 | 6/1999 | Ogasawara et al. | 600/455 |

*Primary Examiner*—Francis J. Jaworski
*Attorney, Agent, or Firm*—Andreas Grubert

[57] ABSTRACT

A method for increasing the valid data points produced by a digital filter. Input data is applied to a pair of filters that produce transients in response to different input data values. Output data from each of the filters is then combined to produce a data set with no transients. In one embodiment, the pair of filters have the same impulse response but the input data is applied to one filter in a first direction and to the other filter in an opposite direction. In another embodiment, the input data is applied to both filters in the same direction but the filters have inverted impulse responses. The present invention is particularly useful for minimizing a gap created when an ultrasound system alternates between different imaging modes. In addition, the present invention, can be used to increase the number of valid data points that are analyzed during color flow ultrasound imaging.

9 Claims, 9 Drawing Sheets

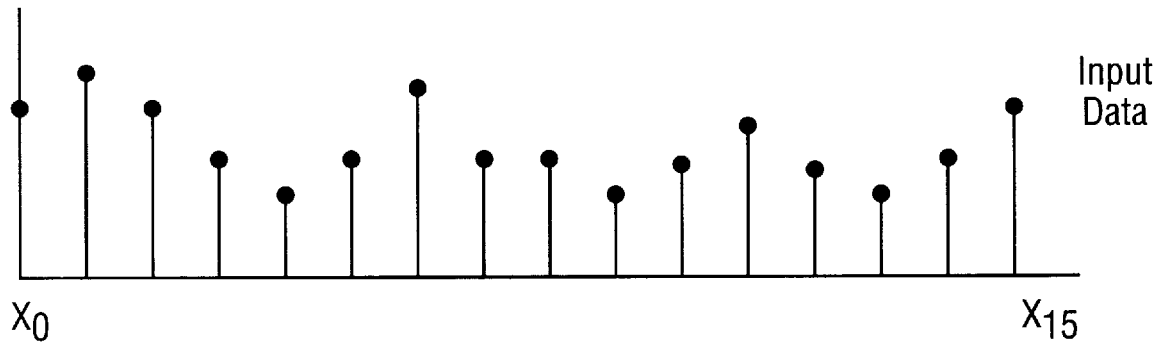
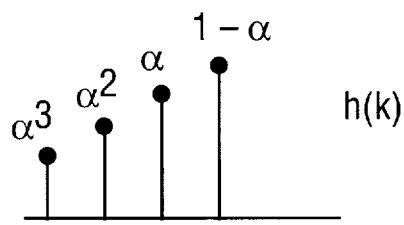
$h(k)$
Forward Processing
Transient Outputs
$$\begin{cases} y_0 = x_0(1-\alpha) + 0 \cdot \alpha + 0 \cdot \alpha^2 + 0 \cdot \alpha^3 \\ y_1 = x_1(1-\alpha) + x_0\alpha + 0\alpha^2 + 0\alpha^3 \\ y_2 = x_2(1-\alpha) + x_1\alpha + x_0\alpha^0 + 0\alpha^3 \end{cases}$$
Valid Outputs
$$\begin{cases} y_3 = x_3(1-\alpha) + x_2\alpha + x_1\alpha^2 + x_0\alpha^3 \\ \vdots \\ y_{15} = x_{15}(1-\alpha) + x_{14}\alpha + x_{13}\alpha^2 + x_{12}\alpha^3 \end{cases}$$
FIG. 1
(PRIOR ART)

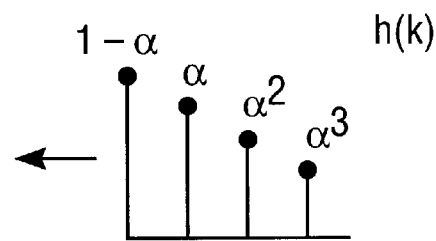

Reverse Processing

Transient $\begin{cases} y'_{15} = x_{15}(1-\alpha) + 0\cdot\alpha + 0\cdot\alpha^2 + 0\cdot\alpha^3 \\ y'_{14} \\ y'_{13} \end{cases}$ Valid $\begin{cases} y'_{12} = x_{12}(1-\alpha) + x_{13}\alpha + x_{14}\alpha^2 + x_{15}\alpha^3 \\ \vdots \\ y'_0 = x_0(1-\alpha) + x_1\alpha + x_2\alpha^2 + x_3\alpha^3 \end{cases}$

FIG. 2

Impulse Response Inverted, Forward Processing

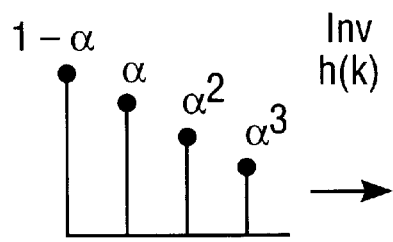

Transient $\begin{cases} y''_0 = x_0\alpha^3 + 0\alpha^2 + 0\alpha + 0(1-\alpha) \\ y''_1 = \\ y''_2 = \end{cases}$ Valid $\begin{cases} y''_3 = x_3\alpha^3 + x_2\alpha^2 + x_1\alpha + x_0(1-\alpha) \\ \vdots \\ y''_{15} = x_{15}\alpha^3 + x_{14}\alpha^2 + x_{13}\alpha + x_{12}(1-\alpha) \end{cases}$

FIG. 3

$$AC = y_1 \cdot y_2^* + y_2 \cdot y_3^* + y_3 y_4^* + y_4' \cdot y_5^* +$$
$$y_4' \cdot y_5^* + y_5 \cdot y_6^* + y_6 \cdot y_7^*$$

METHOD AND APPARATUS FOR REMOVING TRANSIENTS AND GAPS FROM ULTRASOUND ECHO SIGNALS

FIELD OF THE INVENTION

The present invention relates to ultrasound systems in general, and in particular to filters that process ultrasound echo data.

BACKGROUND OF THE INVENTION

In most ultrasound systems, raw echo data is subjected to many digital signal processing operations prior to being displayed or otherwise presented to a physician or ultrasound technician. The most common signal processing operation is filtering the data to remove spurious signals. For example, a wall filter is used in Doppler and color flow imaging modes to isolate the echoes caused by moving blood flow from those echo signals produced by tissue or moving vessel walls.

In any digital filter design, it is desirable to achieve good filtering characteristics, stability and ease of implementation. Most designs are therefore a compromise between these considerations. One problem affecting many designs is that the first few outputs of the filter are erroneous until the filter achieves its steady state operating condition. If supplied with a limited set of input data, these filter transients effect the number of valid data points that can be used to calculate the signals of interest to the physician. For example, the problem is particularly noticeable in color flow imaging where limited data is obtained to calculate blood velocity. In addition, the transient problem exacerbates a gap in Doppler signals that is caused by an ultrasound machine's alternating between different imaging modes.

While there are filter designs that do not produce transients, such as regression filters, these designs are generally computationally complex. In addition, it has been shown that regression filters produce some undesirable artifacts. See Hans Torp et al., "Clutter Rejection Filters in Color Flow Imaging: Theoretical Approach," IEEE Transactions on Ultrasound, March 1997, pp. 417–424.

Given the shortcomings in the art, there is a need for a digital filtering technique that is easy to implement and reduces the number of transients produced in order to maximize the number of valid output data for a limited set of input data.

SUMMARY OF THE INVENTION

The present invention is a method for creating filtered output data from a limited number of input data samples. The method employs creating two sets of filtered data such that each set contains transients that are produced in response to different input samples. Outputs from each set are combined to produce a data set without transients.

One specific application of the present invention is to reduce the size of a gap or discontinuity created in a Doppler signal when an ultrasound imaging system alternates between imaging modes. The present invention applies a set of ultrasound echo data to a forward and backward processing digital wall filter in order to create two sets of filtered data. Outputs of each set are combined to produce a set of outputs without transients. Preferably, the combination is made at a point where each filter produces an output that is nearly zero to minimize the discontinuity between the two sets of filter outputs. Alternatively, the filter outputs in each set can be combined by blending output the data from each set. By adjusting the number of filtered outputs taken from each data set, a combined data set is created that fills the gap during which an ultrasound imaging system operates in an alternative mode.

The present invention is not limited to ultrasound systems that operate in alternating modes. For example, the invention can also be used to increase the number of valid data points produced by a wall filter in color flow imaging.

BRIEF DESCRIPTION OF THE DRAWINGS

FIG. 1 illustrates how transients are produced in a conventional digital filter;

FIGS. 2 and 3 illustrate how digital filtering is performed in accordance with the present invention to create a set of output values that are combined with the outputs of a conventional filter in order to create a data set without transients;

DETAILED DESCRIPTION OF THE PREFERRED EMBODIMENT

Figure 4:
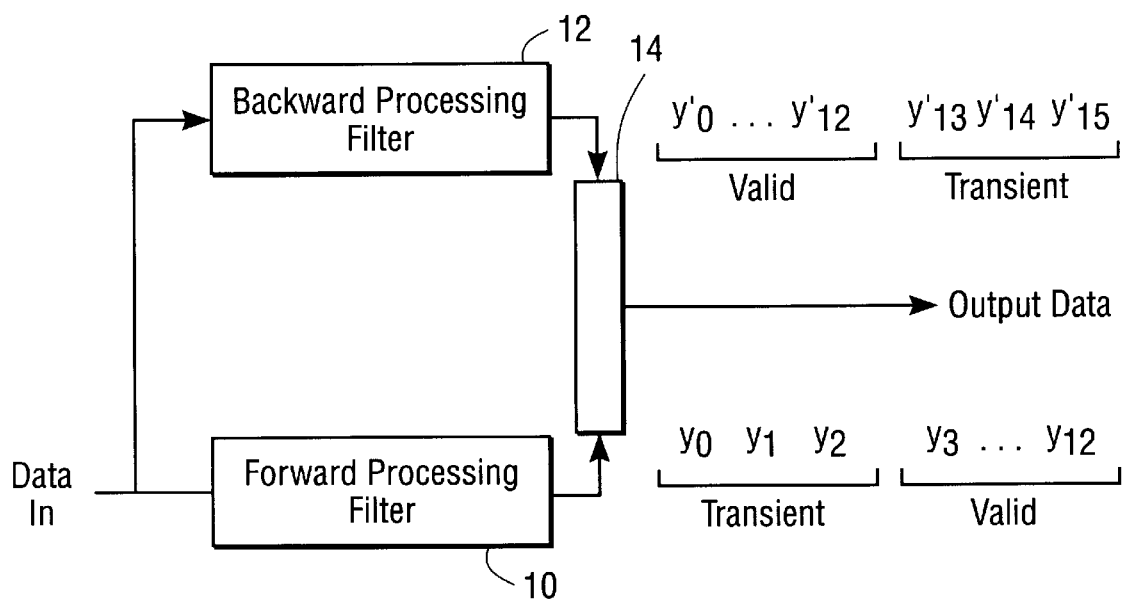
FIG. 4 is a block diagram of a forward and backward processing filter that are used to produce filtered ultrasound echo data without transients according to the present invention.

FIG. 1 illustrates a conventional method of filtering digitized input data with a digital filter having a finite impulse response, h(k). For ease of illustration, the impulse response is given by four coefficients $h_1=1-\alpha$, $h_2=\alpha$, $h_3=\alpha^2$ and $h_4=\alpha^3$, where $\alpha$ is less than one. To create the filtered output data, Yn, a series of input samples $X_0$–$X_{15}$ is convolved with the impulse response of the filter.

As can be seen, the initial three outputs $Y_0$, $Y_1$ and $Y_2$ are transient or erroneous because each coefficient in the impulse response is not multiplied by a valid input data sample. Once each valid input sample is paired with a coefficient of the impulse response, valid output data points $Y_3$–$Y_{15}$ are produced.

As can be seen from the example shown in FIG. 1, the number of transients produced depends on the number of filter coefficients in the impulse response. For the purposes of the present specification, the filter arrangement shown in FIG. 1 is referred to as a "forward processing" filter because the input data is applied to the filter in the order it was received i.e., in chronological order.

To improve the number of valid output data points produced in response to a limited number of input data values, the present invention operates to produce at least two sets of output data wherein any transients in each set are produced in response to different input values. Outputs from each set are then combined to produce a complete set of output values with no transient or erroneous data.

FIG. 2 illustrates one method of computing a set of output data values to be combined with a data set that is produced by a forward processing filter. In the example shown in FIG. 2, the data is applied to a filter in a reverse chronological order. That is, instead of applying the first sample $X_0$ to the filter, the last input data sample, $X_{15}$, is applied to the filter followed by other input samples in reverse chronological order.

As can be seen, the first outputs of the filter $Y'_{15}$, $Y'_{14}$, $Y'_{13}$, are all transients because at least one filter coefficient is not paired with a valid input sample. However, once each coefficient of the impulse response is paired with the valid data sample, valid output data values $Y'_{12}-Y'_0$ are produced.

The effect of processing the data in the reverse chronological order is to create the transients at the end of the data set (when reordered from $Y'_0-Y'_{15}$) rather than at the beginning of the data set as occurs in the forward processing filter shown in FIG. 1. By combining the output data produced by each of the forward and backward processing filters i.e., $Y'_0Y'_3$, from the backward processing filter and $Y_4-Y_{15}$ from the forward processing filter, a valid output sample is produced for each of the input data values. For purposes of the present specification, the filter arrangement shown in FIG. 2 is referred to as a "backward processing" filter.

It will be appreciated that the results obtained from the backward processing filter do not involve the identical calculations as done in the forward processing filter.

The disadvantage with the backward processing filter illustrated in FIG. 2 is that the entire set of input samples must be stored and reordered prior to filtering. In addition, the output values are calculated in reverse chronological order and therefore must be reordered prior to use.

An alternative embodiment of the backward processing filter is shown in FIG. 3. In this embodiment, the output data produced is the same as the output data produced by the backward processing filter as shown in FIG. 2. However, the input data can be applied to the filter in the order it is received and the outputs are produced in the correct order. This approach is passable only for FIR filters. In the case of IIR filters, because of the infinite impulse response and whole filter structure, only the data can be reversed.

In this embodiment, the impulse response of the FIR filter is inverted from the impulse response used in the forward processing filter. That is, $h_0=\alpha_3$, $h_1=\alpha_2$, $h_2=\alpha$ and $h_3=(1-\alpha)$. Convolving the inverted impulse response with the input data $X_0-X_{15}$ produces a set of output data $Y'_0-Y'_{15}$. Again, the first three output values are transients because each filter coefficient is not paired with a valid input data sample. However, the output data filter values $Y'_3-Y'_{15}$ are valid and identical to the output data $Y_0-Y_{12}$ calculated in the backward processing filter shown in FIG. 2. Therefore, the second set of data can be computed either by processing the data in reverse chronological order with the same impulse response coefficients used in the forward processing filter (FIG. 2) or by processing data in the chronological order with an inverted impulse response (FIG. 3).

FIG. 4 illustrates a block diagram of a filtering system used to process ultrasound data in accordance with the present invention. The filtering system utilizes a forward processing filter 10 that is connected in parallel with a backward processing filter 12. The forward processing filter 10 comprises a conventional FIR or IIR filter that receives a series of input data in a chronological order and produces a series of output data values $Y_0-Y_{15}$ wherein the first few output values are erroneous or transient.

The backward processing filter 12 operates to produce a series of output values $Y'_0-Y'_{15}$ having transients that are produced in response to different input data samples than those that create the transients in the forward filter 10. A combiner 14 is therefore selected to receive the output data produced by either the forward processing filter 10 or the backward processing filter 12 in order to produce a complete data set without transients.

Figure 5:
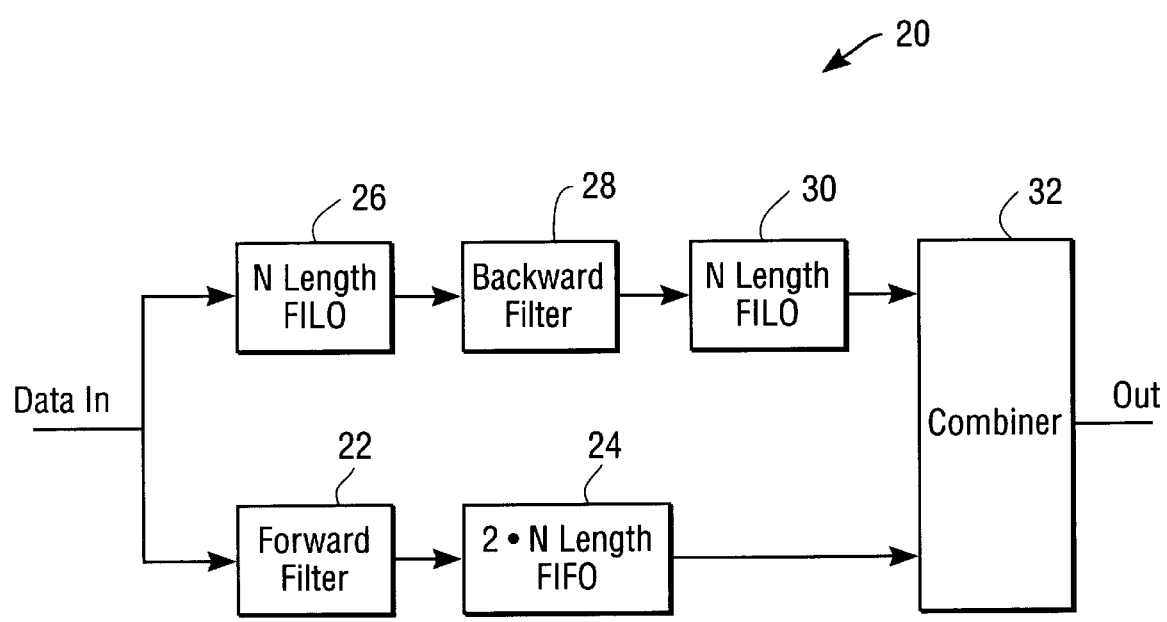
FIG. 5 is a more detailed block diagram of a filter that combines forward and backward processing according to the present invention.

FIG. 5 illustrates a block diagram of a combined forward and backward processing filter that produces a set of output data without transients. This embodiment is particularly useful for where the reserve filter is implemented as an IIR filter. If an FIR filter is used, it is easier to reverse the filter coefficients as discussed above. In a forward processing path, a set of N input samples is applied to a filter 22 that produces a set of output values with a number of transients created in response to a first number of input samples. The output values of the filter 22 are stored in a first in, first out (FIFO) buffer 24 having a length equal to twice the number of input samples supplied. The FIFO buffer 24 is used to insure that the output data produced by the filter 22 in the forward processing path is ready at the same time as the data produced in a backward processing path.

In the backward processing path, the input data is supplied to a first in, last out (FILO) buffer 26 of length N. The FILO buffer 26 operates to reorder the data in a reverse chronological order. The reordered data is applied to a backward processing filter 28 that convolves the data with the same impulse response function as used in the forward filter 22. The output of the backward filter 28 is supplied to a first in, last out (FILO) buffer 30 that reorders the output data in the proper chronological order. Data from the buffers 24 and 30 are supplied to a combiner circuit 32 which operates to select either the data produced in the forward or backward data processing path. As described above, the combiner 32 operates to select nontransient data from each data processing path such that an entire set of output data without transients is produced. In the case of a very long sequence and an IIR filter structure, as shown in FIG. 5, the first N-T samples will be created with the backward channel where N is the length of the FILO buffer 26 and T is the number of transients produced. The remaining output samples, y(k) where k>(N-(T-1)) will be generated by the forward filter.

One specific application of the present invention is to reduce the discontinuities in a Doppler ultrasound signal due to alternate mode firings. In addition, the present invention can be used with color flow imaging to increase the number of data points used to estimate the speed of blood flow.

Figure 6:
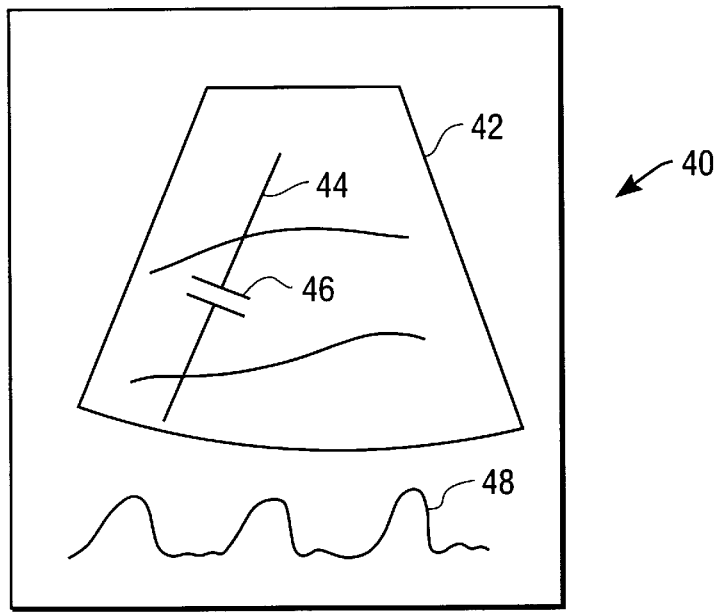
FIG. 6 illustrates a combined B-mode and Doppler mode image.

FIG. 6 illustrates a typical combined B-mode and Doppler mode ultrasound image. The combined image 40 includes a B-mode image 42 that allows a physician to view the structure of the internal body tissue of a patient under examination. Typically, the B-mode image 42 is shown as a two-dimensional, black and white image.

If the physician wishes to simultaneously investigate the flow of blood within the tissue, a range gate 44 is produced on the display. The range gate 44 is aligned with the direction at which the ultrasound beam is directed into the patient and includes a pair of markers 46 that determine the depth within the tissue from which the Doppler information is to be obtained. A Doppler image 48 comprising a graph of the velocity of the blood contained at the depth specified by the markers on the range gate versus time is shown on the composite image 40. Therefore, by viewing the B-mode and Doppler images, the physician is able to diagnose the patient under examination. In addition to displaying the Doppler image 48, the Doppler signals may be applied to a pair of speakers (not shown) so that a sonographer can "hear" the direction and velocity of the blood flow.

Figure 7:
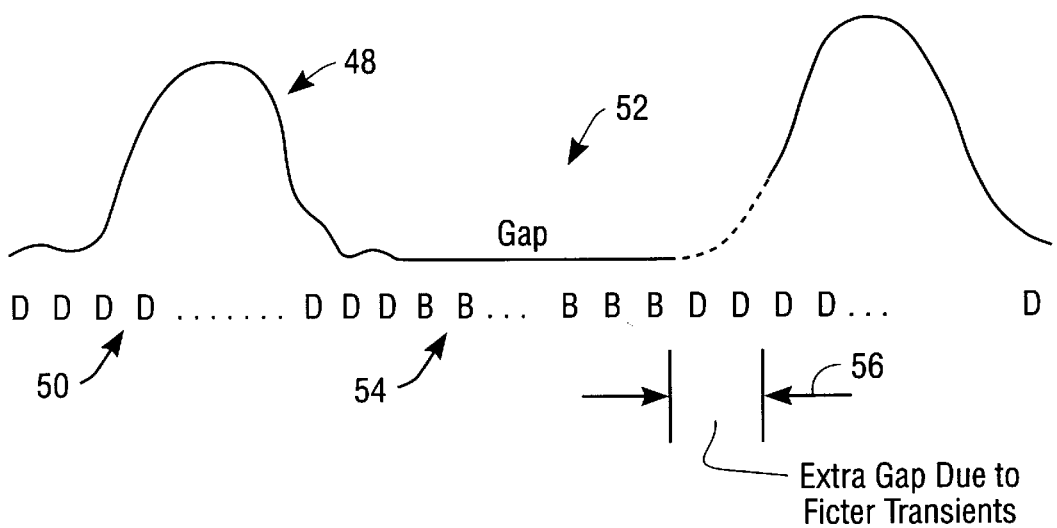
FIG. 7 illustrates the alternate ultrasound firings required to produce the combined ultrasound image shown in FIG. 6.

As indicated above, in order to produce a composite display, the ultrasound system transmits different ultrasound signals into the patient. FIG. 7 illustrates a typical pattern of ultrasound firings and how they correlate with the image of the Doppler signals. The Doppler display 48 that depicts the velocity of the tissue versus time is computed by firing a number of Doppler pulses 50 into the patient. The Doppler data created in response to these pulses is calculated and either graphed or played for the sonographer. When it is time to refresh the B-mode display, the Doppler pulses end and a series of B-mode pulses 54 are fired. Because no Doppler information is being obtained during this time, the Doppler display 48 includes a gap 52 that is visible on the display or audible if the Doppler signals are played as audio signals for the sonographer.

Because the echo signals occurring as a result of moving blood flow are generally much weaker than the echo signals caused by moving tissue or vessel walls, the echo data created in a response to the Doppler mode firings are filtered with a digital wall filter that operates to remove the low-frequency, high-intensity signals from the echo signals received.

Typically, the wall filter is an infinite impulse response (IIR) filter, the designs of which are considered well-known and therefore will not be discussed further except as it relates to the present invention. Most digital wall filters require a number of input samples to be supplied to the filter before they achieve their steady-state response. Thus, there is an extra gap 56 that occurs between the first Doppler mode firing and the time at which the Doppler data can be displayed or played for the physician. This extra gap 56 serves to further increase the length of the gap 52 in the Doppler display 48.

To reduce the length of the gap or discontinuity in the Doppler display or Doppler audio signal, the present invention uses a forward and backward processing digital wall filter wherein a portion of the filtered echo data produced by each filter is combined to produce an output data set with no transients.

For example, if the forward processing digital wall filter requires 100 samples to be applied before achieving its steady-state condition, the transient data points can be replaced with the outputs of the backward processing digital wall filter that are produced in response to the first 100 echo data samples. Because a valid output value is obtained for each input sample, the extra gap 56 shown in FIG. 7 is eliminated.

Figure 8:
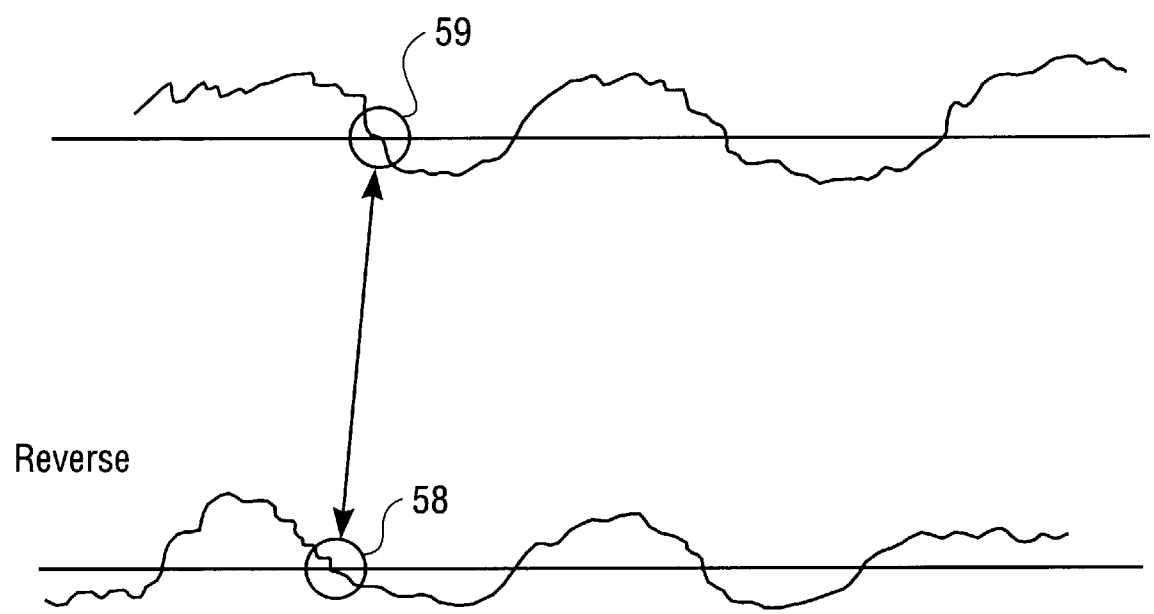
FIG. 8 illustrates how data produced from a forward and backward processing digital wall filter can be combined in order to fill in a gap in a Doppler echo signal.

In order to create a relatively smooth transition between the output data from the forward and backward processing digital filters, the transition is made between the outputs of the backward digital filter and the forward digital filter when both filters have outputs near zero. FIG. 8 illustrates the preferred way of combining data from the backward and forward processing filters. In particular, the point at which the data from the backward processing digital filter is joined to the output data from the forward processing digital filter should be made at a point 58 where the backward processing filter has an output that is near zero with a positive or negative slope and at a point 59 where the output data from the forward processing filter has a value near zero and an opposite slope.

As an alternative to abruptly concatenating the outputs from one filter to another, the output values of the filters may be proportionally combined over a number of outputs. For example, an output may be generated that utilizes 90% of the backward processing filter and 10% of the forward processing filter followed by 85% of the backward processing filter and 15% of the forward processing filter, etc., in order to smoothly blend the two filter outputs.

Figure 9:
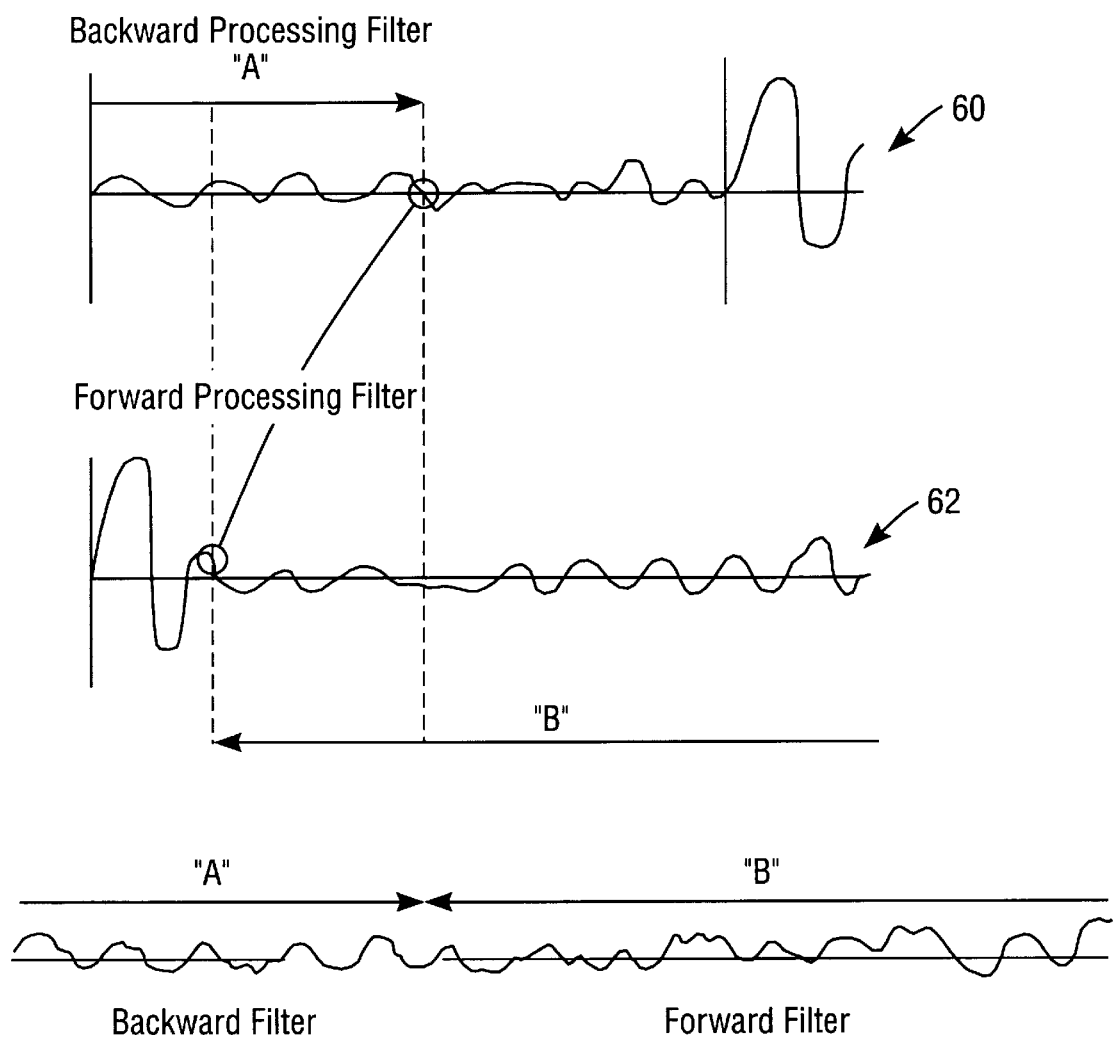
FIG. 9 illustrates how data produced by a forward and backward processing digital wall filter are combined to minimize discontinuities.

FIG. 9 illustrates how the outputs of the forward and backward processing filters can be combined in order to create data that can be used to fill in the gap that is created when the ultrasound imaging system is operating in a non-Doppler mode. A graph 60 illustrates the outputs of the backward processing filter in response to a set of input echo data. A graph 62 illustrates the outputs of the forward processing filter created in response to the same set of input echo data. As indicated above, the present invention utilizes a number of the outputs of the backward processing filter for a time period "A" and concatenates the outputs with the outputs of the forward processing filter for a time period "B." The duration of the time period "A plus B" is equal to one cycle of the Doppler imaging plus the gap time when the ultrasound machine performs another type of imaging. As will be appreciated by viewing FIG. 9, there is some overlap in the output data contained in the time period A and the time period B. However, in practice this repeated data is relatively short compared to the length of the Doppler signal and does not seriously detract from the accuracy of the Doppler signal displayed on a monitor or played through speakers to the sonographer.

Figures 10, 11:
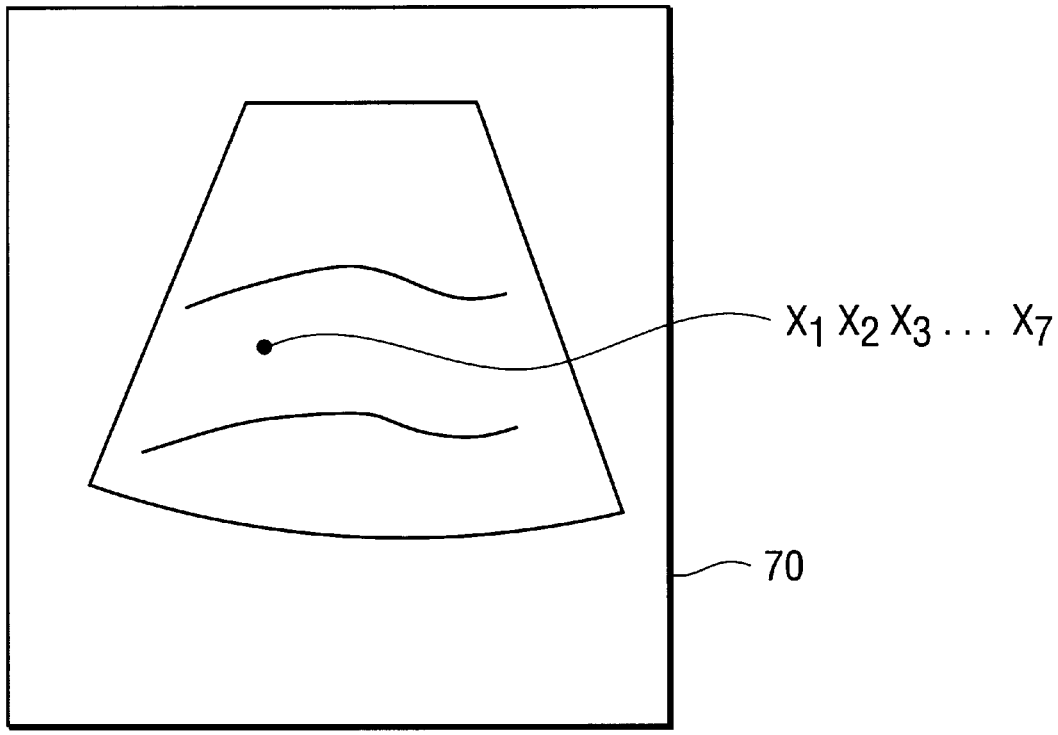
FIG. 10 illustrates the limited number of echo data points that are typically obtained in color flow imaging.
FIG. 11 illustrates the structure of a filter that increases the number of points for use in computing blood velocity using forward and backward processing according to the present invention.

The present invention is not limited to ultrasound systems that alternate between different imaging modes. The invention can be used in any environment wherein it is desirable to maximize the amount of data received from a digital filter that creates transients in response to the initial number of data samples applied. As illustrated in FIG. 10, many ultrasound systems perform color mode imaging, where each point to be imaged in the body is subjected to a relatively short number (typically 8–16) of ultrasound pulses. The echo data, $X_0$–$X_7$, created in response to these pulses is analyzed to determine a frequency shift between them. If the frequency is shifting, then the echo data is shown in a color that is representative of the velocity of the tissue. However, if no frequency shift is detected, the echo data is typically shown in black and white.

Before the input echo data, $X_0$–$X_7$, created in a response to the short number of ultrasound pulses can be frequency-analyzed, it is applied to a digital wall filter that removes those echo signals created in response to moving tissue or artery walls. Typically, this wall filter is a digital filter that produces transients in response to the first few data points. If conventional filtering is used, the number of valid data points created is reduced by the number of transients produced by the filter. In order to increase the number of data points used to make a tissue/flow determination, the present invention supplies the echo data to a forward and backward processing filter.

The forward and backward filters each produce transients in response to different input samples. Therefore, outputs from each of the filters can be combined to produce a data set having no transients.

FIG. 11 illustrates how a forward and backward processing filter can be constructed in order to increase the number of valid output data points from a limited number of input samples. The filter can be constructed using a matrix 100 wherein one half of the matrix represents the backward processing filter 102 and the other half of the matrix represents the forward processing filter 104. Each matrix contains the same impulse response coefficients. However, the coefficients for the backward processing filter are preferably inverted compared to the forward processing filter. That is, the first row of the matrix for the forward processing filter contains the coefficients $h_4, h_3, h_2, h_1 0, 0, 0$, while the first row of the backward processing filters contains the filter coefficients $h_1, h_2, h_3, h_4, 0, 0, 0$.

The matrix 100 scales the set of input data $X_1, X_2, \ldots X_7$ to produce a series of output values $Y_1, Y_2, Y_3, Y_4, Y'_4, Y_5, Y_6, Y_7$. The output values $Y_4$ and $Y'_4$ are similar in that the largest coefficient of the impulse response is multiplied by the same input data value. In order to determine whether the source of the echo signals is moving, a first lag autocorrelation for the echo signals is determined between the output data pairs $Y_1, Y^*_2; Y_2, Y^*_3; Y_3, Y^*_4; Y_4, Y^*_5; Y_5, Y^*_6$ and $Y_6, Y^*_7$ to avoid the artifacts mentioned in the Thorp et al. article discussed above. Only pulse pairs from the backward processing filter 102, or the forward processing filter 104 are used. No analysis is performed on the pairs $Y_4$ and $Y_4$ that cross the boundary between output values produced for the backward processing filter and those produced by the forward processing filter.

Using the forward and backward filters as shown in FIG. 11, the number of valid output data samples is increased to equal the number of input data samples. Therefore, a more accurate determination of the flow of a particular point in the body can be computed.

Figure 12:
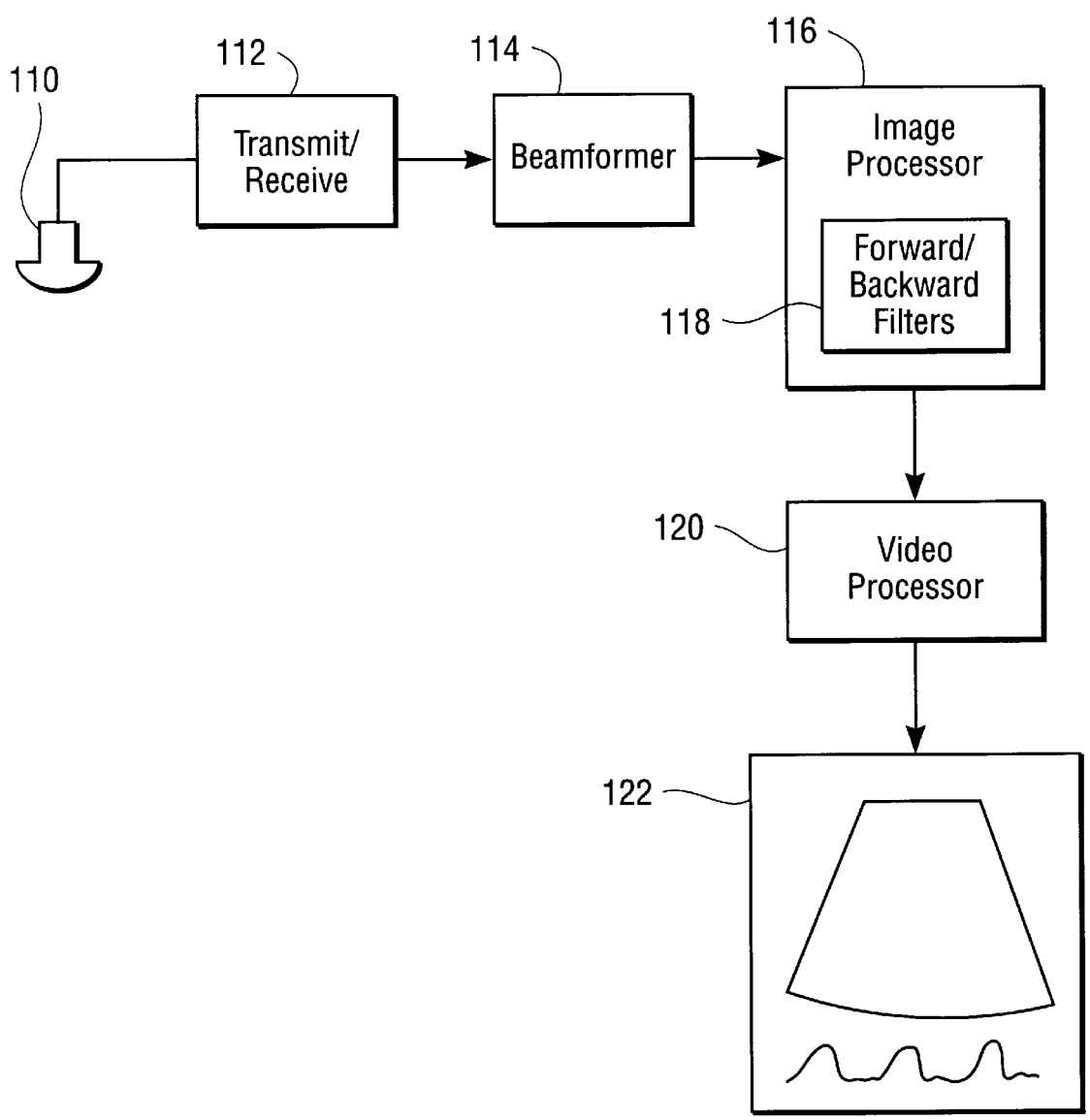
FIG. 12 is a block diagram of an ultrasound system that incorporates the forward/backward processing filters according to the present invention.

FIG. 12 is a block diagram of an ultrasound system that includes the forward/backward processing filters described above. An ultrasound transducer 110 transmits ultrasound signals into the patient and receives echo signals from tissue or moving blood flow. The ultrasound transducer is controlled by a transmit/receive block 112 that either supplies the ultrasound signals to be transmitted into the patient to the transducer and receives the electronic echo signals created by the transducer in response to received echoes. The electronic echo signals received by the transmit/receive block 112 are supplied to a beam former 114 where they are spatially processed to produce echo data having a magnitude corresponding to the strength of the echo signals at each position in the body. Echo data produced by the beam former 114 is supplied to an image processor 116 that performs a variety of digital processing techniques. The image processor 116 includes the forward and backward processing wall filters 118 described above. Valid output data produced by the image processor is supplied to a video processor 120 that converts the data into a format that can be displayed for a user. The output of the video processor 120 supplies a video monitor 122 with signals that can be displayed for a physician or sonographer.

The embodiments of the invention in which an exclusive property or privilege is claimed are defined as follows:

1. A method of producing a set of filtered data points with a digital filter that produces a number of transients in response to an initial number of applied data points, comprising:

applying a set of data points to a first filter to create a first set of transient output data points and a first set of valid output data points;

applying the set of data points to a second filter to create a second set of transient data points and a second set of valid data points wherein the second set of transient data points are created using different input data points than are used to create the first set of transient data points; and combining at least a portion of the first set of valid data points and at least a portion of the second set of valid data points to produce a set of data points without transients, wherein at least for a predefined first period of time said first set of valid data points, and for a predetermined second period of time said second set of valid data points, are used to produce said set of data points without transients.

2. The method of claim 1, wherein the second filter is the same as the first filter but the input data points are applied to the first filter in a first order and wherein the set of input data points are applied to the second filter in a reverse order.

3. The method of claim 1, wherein the first filter and the second filter have an inverted impulse response and the input data points are applied to the first and second filter in the same order.

4. The method of claim 2 or 3, wherein the first and second filters are wall filters.

5. The method of claim 2 or 3, wherein the set of input data points are samples of echo signals received in an ultrasound imaging system.

6. The method of claim 5, wherein the ultrasound imaging system operates in a Doppler mode and in a B-mode such that when operating in the B-mode, there is a gap in a Doppler echo signal produced, wherein the step of combining the portion of the first set of valid data points and the portion of the second set of valid points creates a sufficient number of valid data points to fill in the gap.

7. An ultrasound imaging system, comprising:

an ultrasound transducer that transmits ultrasound signals into a patient and produces electronic echo signals in response to echo signals reflected from the patient;

a beamformer that receives the electronic echo signals and produces echo data representative of tissue and moving blood flow in the patient;

an image processor that receives the echo data and produces a B-mode image of the tissue and a Doppler image representative of the velocity of blood flow in the tissue, the image processor including a forward and backward processing digital wall filter that receive the echo data to produce a first set of transients and a first set of valid data points, and a second set of transients and a second set of valid data points wherein the second set of transients are created in response to different echo data than the first set of transients, the image processor combining a portion of the first set of valid data points with the second set of valid data points to produce the Doppler image; and a monitor on which the B-mode and Doppler image are displayed.

8. The ultrasound system of claim 7, wherein the forward and backward processing filters are the same but the echo data is applied to the forward processing filter in a first order and to the backward processing filter in a reverse order.

9. The ultrasound system of claim 7, wherein the forward and backward processing filters have inverted impulse responses.

* * * * *